(12) United States Patent
Vasilyuk et al.

(10) Patent No.: US 11,287,532 B2
(45) Date of Patent: Mar. 29, 2022

(54) GNSS RECEIVER WITH SYNCHRONIZATION TO EXTERNAL TIMESCALE

(71) Applicant: Topcon Positioning Systems, Inc., Livermore, CA (US)

(72) Inventors: Nikolay Nikolaevich Vasilyuk, Moscow (RU); Andrey Vladimirovich Veitsel, Moscow (RU); Sergey Ivanovich Tychinskiy, Moscow (RU); Alexandr Vladimirovich Doronin, Moscow (RU); Alexey Stanislavovich Lebedinsky, Moscow (RU); Konstantin Viktorovich Ebauer, Moscow (RU)

(73) Assignee: Topcon Positioning Systems, Inc., Livermore, CA (US)

( * ) Notice: Subject to any disclaimer, the term of this patent is extended or adjusted under 35 U.S.C. 154(b) by 515 days.

(21) Appl. No.: 16/343,899

(22) PCT Filed: Nov. 13, 2018

(86) PCT No.: PCT/RU2018/000742
§ 371 (c)(1),
(2) Date: Apr. 22, 2019

(87) PCT Pub. No.: WO2020/101518
PCT Pub. Date: May 22, 2020

(65) Prior Publication Data
US 2021/0364646 A1    Nov. 25, 2021

(51) Int. Cl.
*G01S 19/23* (2010.01)
*G04F 10/00* (2006.01)

(52) U.S. Cl.
CPC .............. *G01S 19/23* (2013.01); *G04F 10/00* (2013.01)

(58) Field of Classification Search
CPC ...... G01S 19/23; G01S 19/235; G01S 19/256; G04F 10/00
(Continued)

(56) References Cited

U.S. PATENT DOCUMENTS 6,646,604 B2    11/2003  Anderson
7,626,539 B2 *  12/2009  de Salas ................ G01S 19/03
                                                       342/357.31
(Continued)

FOREIGN PATENT DOCUMENTS

EP       0855041 B1    12/2002
WO    2014106125 A1     7/2014

OTHER PUBLICATIONS

Search Report in PCT/RU2018/000742, dated Aug. 22, 2019.

*Primary Examiner* — Harry K Liu
(74) *Attorney, Agent, or Firm* — Bardmesser Law Group

(57) ABSTRACT

GNSS timing receiver with synchronization of raw GNSS measurements to an external timescale. Synchronization is achieved by using a hardware Time Interval Measurement Unit (TIMU). The TIMU measures time intervals between two pulse signals and makes additional processing of these measurements. The first pulse signal is generated inside the GNSS receiver. The second pulse signal is the external pulse signal generated by an external time reference device. This time interval is used to control the time instant when the output GNSS measurement will be taken. In the first embodiment all actual GNSS measurements are physically taken at time instants indicated by external pulse signal. These measurements are used as output GNSS measurements. In another embodiment all actual GNSS measurements are taken at their default time instants indicated by internal pulse signal. But output GNSS measurements are calculated at the time instants indicated by the external pulse signal.

21 Claims, 4 Drawing Sheets

(58) Field of Classification Search
USPC .................................................. 342/357.62
See application file for complete search history.

(56) References Cited

U.S. PATENT DOCUMENTS

| | | | |
|---|---|---|---|
| 8,686,900 B2 | 4/2014 | Whitehead et al. | |
| 9,810,788 B2 | 11/2017 | Raghupathy et al. | |
| 2014/0003199 A1* | 1/2014 | Dougan ................ | H04J 3/0641 |
| | | | 368/46 |

* cited by examiner

GNSS RECEIVER WITH SYNCHRONIZATION TO EXTERNAL TIMESCALE

BACKGROUND OF THE INVENTION

Field of the Invention

The present invention relates to the field of synchronization of GNSS-receivers with external timescale provided by external clock source and to the field of hardware design of integrated devices to support this synchronization.

Description of the Related Art

The GNSS positioning is based on a measurement of the radio signal's propagation time between transmitting and receiving antennas [1]. The transmitting antenna is placed on the navigation Space Vehicle (SV). The receiving antenna is the antenna of the GNSS receiver. The receiving antenna can simultaneously receive different navigation signals transmitted by different SVs.

Each SV has its own high precision time reference device. All these time reference devices of all SVs are synchronized with the time reference device of the GNSS ground control center. All these time references (SVs time references and the ground control time reference) jointly create a common GNSS timescale. All SVs transmit their own GNSS signals simultaneously according GNSS timescale. The transmission instant of each GNSS signal is encoded within that signal. So, when the GNSS receiver receives the GNSS signal it can determine the transmission instant according GNSS timescale. When the GNSS receiver simultaneously receives several GNSS signals transmitted by different SVs all these signals have different transmission times (but common reception time) because of different pathlengths between single receiving antenna and different transmitting antennas.

The GNSS receiver also has its own time reference device. As usual this time reference is a local oscillator like a mid-grade quartz oscillator. This local oscillator, the nominal starting time (time zero), the time counter and the time counter's correction algorithm jointly produce the receiver's timescale. When the GNSS receiver receives several GNSS signals simultaneously, the common receiving time of all these signals is measured according receiver's timescale. The difference between transmitting and receiving times of each GNSS signal is the pseudo-propagation time of this signal. If this time difference is multiplied by the speed of light this product is called a pseudorange.

The GNSS receiver's timescale is not completely synchronized with GNSS timescale. The difference between GNSS timescale and the receiver's timescale is called the time correction. To determine the position of the receiving antenna from pseudoranges the GNSS receiver must determine the value of this time correction. The time correction is added to a positioning set of equations as an additional unknown value in addition to three unknown spatial coordinates. The left side of this set of equations is filled by measured pseudoranges. Because these equations contain four unknowns, minimum four different pseudoranges must be measured. So, to measure the position of the receiving antenna the GNSS receiver must receive four different GNSS signals transmitted by four different SVs.

If the receiving antenna is placed in some fixed position and this position is known precisely the GNSS receiver may be used as a time reference and synchronization device [2]. The GNSS receiver operating in this mode is called the timing receiver. The timing GNSS receiver produce the local version of the high-precision GNSS timescale. The timing GNSS receiver use an external high-stable frequency source in place of its own local oscillator and measures only one unknown—the current value of time difference between GNSS timescale and externally clocked receiver's timescale. This time difference is used for periodic correction of the receiver's timescale to maintain the synchronization with GNSS timescale. An output electrical Periodic Pulse Signal (PPS) produced from synchronized receiver's timescale is used as a physical time reference for synchronization of various external devices.

The time difference determined by GNSS timing receiver includes not only an actual difference between different timescales but also all propagation delays within GNSS receiver. These delays are external and internal cables belays, internal analog circuits delays and so on. All these delays must be calibrated and compensated for correct calculation of the time difference between two timescales. So, the precision of the GNSS receiver as the time reference device is limited by the precision of delays calibrations, calibrations stability and internal noises which affect the internal timing algorithm. For most practical applications like communication equipment synchronization (GSM, CDMA, networking) this precision is enough.

The GNSS timing receiver may be used not only as the high-precision time reference device but also to measure GNSS signals pathlengths between space-based SVs transmitting antennas and the single ground-based receiving antenna. If to extract the time difference (determined by timing receiver) from the pseudo propagation time measured by this receiver, the result will be the true propagation time. The product of the true propagation time and the speed of light is the true pathlength of a GNSS signal. This true pathlength also called the true range.

It is possible to direct the GNSS timing receiver to made measurements of true ranges at designated periodic time instants according its own version of the GNSS time scale. But the precision of time instants of these measurements will be limited by timescale synchronization errors as described above. For very special applications like GNSS infrastructure support, high-precision GNSS SVs orbital parameters distribution, etc., the accuracy of GNSS measurements synchronization must be enhanced. Also, for application of these kinds it is required to point the exact time with respect to some external high-stable timescale (non-GNSS timescale) when GNSS measurements must be made.

The common approach to solve this synchronization problem is to synchronize GNSS measurements instants with external timescale in postprocessing. To implement this approach the external high-precision time reference device has to provide both a frequency signal to clocking the GNSS timing receiver and a PPS to designate required instants for GNSS measurements. The PPS generated by GNSS timing receiver designates actual instants of GNSS measurements. These two PPSs (one from external time reference and another from GNSS timing receiver) are connected to Time Interval Measurement Unit (TIMU). The TIMU continuously measures the time difference between two incoming pulses. GNSS measurements at the receiver's PPS instants, time tags of these measurements according GNSS timescale and measured time intervals between two PPSs are recorded into one common file. The typical duration of this file's record is one hour. This file is processed by special software to interpolate original GNSS measurements to instants marked by external PPS.

The evident drawback of this approach is the impossibility to take GNSS measurements at required instants immediately. All required GNSS measurements will be available only after processing of logged data (after one hour or more). In other words, conventional schemes that rely on post-processing cannot deal with the issue of the receiver's clock drift in real time.

SUMMARY OF THE INVENTION

To overcome the drawbacks described above, a new approach is proposed in this application. According to the proposed approach, the TIMU is placed directly inside the GNSS receiver's housing. The TIMU measurements are transferred directly to the GNSS signals processor. A GNSS Firmware (FW) corrects GNSS measurement process with the aid of TIMU measurements in real time to receive new measurements at the required time instants.

The invention therefore relates to a timing GNSS receiver with Time Interval Measurement Unit inside. This receiver can track the external PPS generated by high precision time reference and take GNSS measurements at the time instances designated by this PPS in real time. Also, this invention describes the algorithm of real-time correction of GNSS measurement process to produce GNSS measurements in required time instants.

To produce real-time GNSS measurements synchronized with an external high-precision time reference, the timing GNSS receiver must be clocked by an external high-precision frequency source. Most of external time references available on the market produce a stable frequency signal in conjunction with the PPS signal. These two signals, the frequency signal and the PPS signal, are obtained from a single high-precision oscillator, such as an active hydrogen maser or a cesium fountain, and precisely synchronized. So, when GNSS receiver is clocked by frequency of this kind the stability of its local realization of the GNSS timescale is limited by the stability of external high-precision time reference.

The GNSS processor accommodated inside the GNSS receiver's housing generates several PPSs. One of these PPSs may be outputted on the outlet on the receiver's front or rear panel to synchronize some external devices. Other PPSs may be connected to some units inside the receiver's housing. All these PPSs are synchronized with GNSS timescale and may be used as physical embodiments of time instants on this timescale.

The TIMU is compact-size electronic device which may be divided on two parts—an analog time measurement part (a time interval transducer) and a digital control and interface part. The time interval transducer is thermostated to eliminate the temperature dependencies of precision time measurement circuits. The thermostat is controlled by digital control part. Also this digital control part is used to read time measurements from transducer and to send these measurements via digital interface to GNSS processor. The time interval transducer has two pulse inputs. One pulse input is connected to external PPS, another pulse input is connected to PPS generated by GNSS processor (internal PPS). The nominal frequency of PPS generated by GNSS processor is selected the same as the frequency of PPS generated by external time reference.

At the start condition TIMU waits the first incoming edge of PPS (external or internal). This first edge triggers the time interval counter which will count the time up to detection of incoming edge of another PPS. This second edge stops the counter. If the starting edge is edge of external PPS the stopping edge will be edge of the internal PPS and vice versa. The counted value is the time interval duration between two pulses. If the first incoming edge is the edge of external PPS the time interval value is considered as negative. If the first incoming edge is the edge of internal PPS the time interval value is considered as positive.

The time interval measured by TIMU is indicate the shift of receiver's GNSS time scale with respect to external timescale. But the single TIMU measurement have not enough precision for time scales synchronization. As mentioned above these two timescales are clocked by common high-stable clock reference. So, these two timescales have very low relative time drift and the series of consequent TIMU measurements may be averaged to obtain smoothed noise-free estimation of the time shift. Because of low relative drift of these two timescales this averaging may be made by sliding window. This approach allows to produce the averaged time shift values at the same rate as the original (non averaged) TIMU measurements provided.

By default, the time instant when GNSS measurements are made and the internal PPS are linked to the same receiver's GNSS timescale. The averaged time shift value may be used to connect the GNSS measurement instant to external timescale. To do this the GNSS processor have to take this value and change the output measurement instant with respect to default one. If this value is negative the output measurement instant has to be shifted left on the time axis relative to its default position. If the averaged value is positive the output measurement instant has to be shifted right on the time axis relative to its default position.

There are two approaches to implementing this shift of the measurement instant. The first approach is the physical shift of all measurements. All GNSS data processing algorithms are corrected to produce GNSS measurements exactly at required time instants. This approach is not optimal because of the averaged time shift is not a stable value. This value is changed from one time interval measurement to another. All GNSS data processing algorithms must to track these changes in real time and constantly reorganize data processing sequences to produce GNSS measurements. This reorganization is accompanied by large overheads in the form of expenditure of real-time computing resources. The positive effect of this approach is the absence of additional errors into output GNSS measurements with corrected time instants.

Another approach is to use useful properties of raw GNSS measurements. All measured pseudoranges are quite slowly changing values with a well-known underlying physical model of the changes. This model may be used to interpolate (if averaged time shift value is negative) or extrapolate (if averaged time shift value is positive) actual GNSS measurements taken at their default positions. The interpolation (or extrapolation) error will be quite small because of slow changes of actual GNSS measurements. This approach does not require any changes or corrections into GNSS data processing algorithms. It only requires very simple task for secondary processing of GNSS data with very small overheads. This approach introduces some acceptable error into output GNSS measurements with corrected time instants.

There are various versions of GNSS devices and measuring systems that use synchronization with external time sources and external time scales.

The system described in [3] includes two GNSS receivers and two atomic clocks. One GNSS receiver is a stationary base station (base) that synchronizes the first atomic clock with the GNSS system time scale. Another GNSS receiver (rover) and the second atomic clock are installed on the moving vehicle. Before the vehicle starts to move, the second atomic clock is synchronized with the first atomic clocks. After the synchronization of the second atomic clocks has completed, the rover starts to move and its GNSS receiver starts to measure the coordinates of the rover. To measure the coordinates of the rover, the GNSS receiver in conjunction with the second atomic clock is solving the system of equations only for rover's three unknown parameters—the rover's coordinates. The fourth parameter, the correction to the rover's clock, is zero, because the time of reception of the GNSS signals is measured by the second atomic clock synchronized with the time scale of the GNSS system.

The system described in [4] includes a GNSS base station and an additional clock. This clock is synchronized with the GNSS time scale using the synchronization signal that is generated by the GNSS-base. After the synchronization is completed, this clock can independently generate a timing signal synchronized with the GNSS time scale. This feature is used when the synchronization signal from GNSS-base lost for a limited period of time.

The systems in [3] and [4] differ from the present invention because of the GNSS-base performs measurements in the GNSS time scale and synchronizes the external time source with this scale. In the present invention, the stationary timing GNSS receiver performs GNSS measurements at times specified by an external time source that can work asynchronously with respect to the GNSS system time scale.

The composite measuring device described in [5] includes a sensor, an analog to digital converter (ADC), an atomic clock, and a built-in microcontroller. This device is considered as a component of a distributed sensor network, which is controlled by the common host. The microcontroller reads the measurements from the output of the ADC and assigns the time tag to each new measurement. The time tag is received from embedded atomic clock at the measurement time instant. Measurements, with time tags are transmitted over a digital communication channel to the common host for further processing. The composite measuring device of [5] performs measurements at times specified by its own clock. In the present invention, the timing GNSS receiver performs measurements at instants directly specified by an external time source.

The system in [6] includes an external reference oscillator, a GPS receiver and a time interval counter to measure time difference between GPS receiver's PPS and external pulse. Several systems of this kind are located on a local area and send the time difference data to the central processor. The central processor uses these time differences between receiver's PPSs and local events to calculate time differences between local events occurred on different locations to measure the aircraft's height. The difference between system [6] and the present invention is the local usage of time difference between PPS and external event to shift the time instant of GPS measurements. The presents invention does not use a remote central processor to process the time differences. Also the present invention uses measured time differences to shift GNSS measurement instants but not to measure the height.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF EMBODIMENTS OF THE INVENTION

Reference will now be made in detail to the preferred embodiments of the present invention, examples of which are illustrated in the accompanying drawings.

Figure 1:
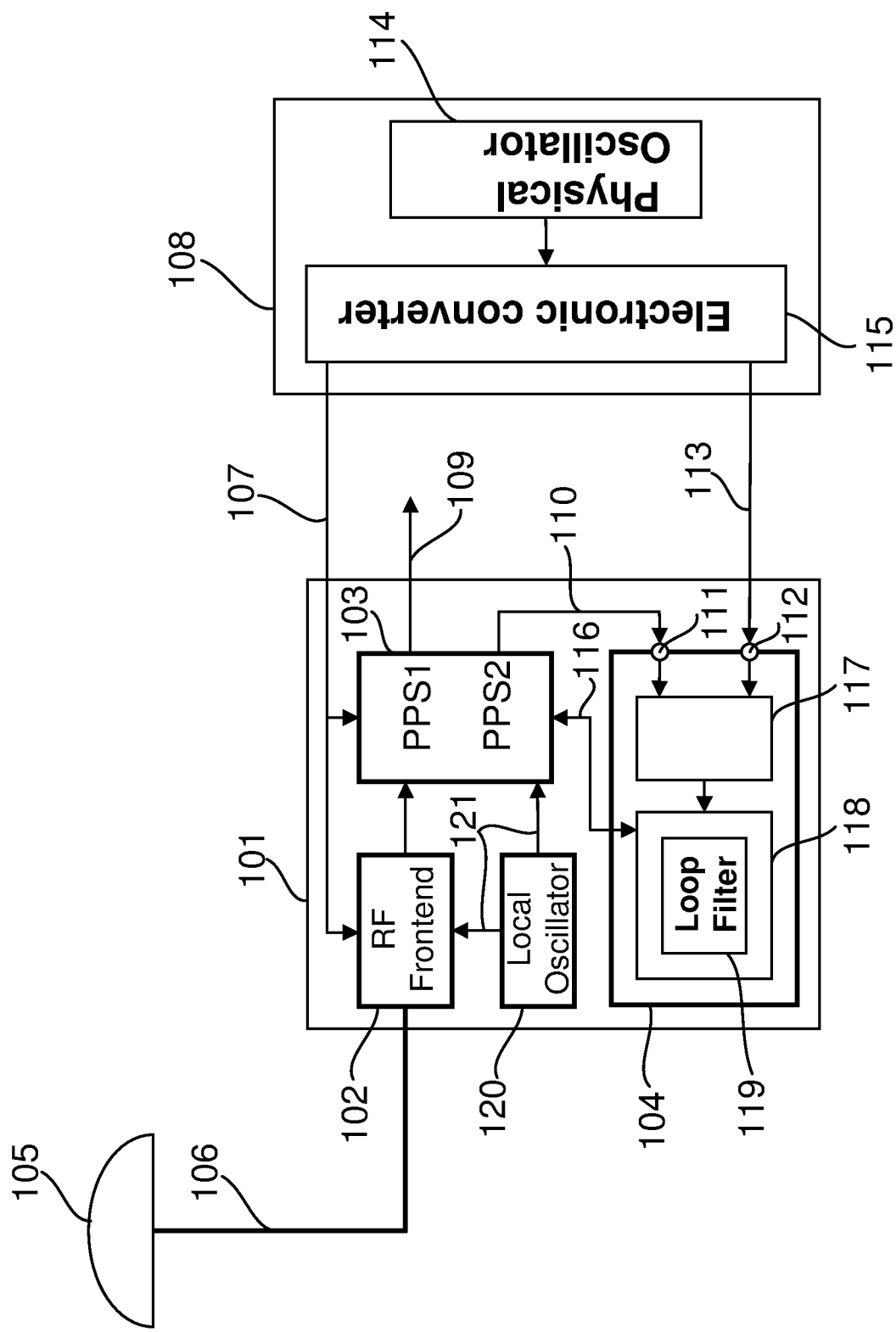
FIG. 1 shows a general view of the GNSS receiver synchronized with external high-stable time reference.

FIG. 1 illustrates the general view of the timing GNSS receiver synchronized with external high-stable time reference. The stationary timing GNSS receiver 101 includes a GNSS RF Frontend 102, a GNSS digital processor 103 and a Time Interval Measurement Unit 104. The GNSS RF Frontend 102 receives GNSS signals from an external GNSS antenna 105. The antenna 105 is mounted on the fixed base and connected to the GNSS RF Frontend 102 via an antenna cable 106. The GNSS receiver 101 is clocked by an external frequency signal 107, generated by the external time reference device 108. The typical frequency of the signal 107 is 10 MHz.

If the external frequency signal 107 is not available, the GNSS receiver 101 may be clocked by internal mid-precision Local Oscillator 120. In this case the internal frequency signal 121 is used for clocking of the GNSS RF Frontend 102 and GNSS processor 103.

The GNSS processor 103 process the GNSS navigation signal received by antenna 105 and demodulated by RF frontend 102. The processor 103 extracts a navigation information from this signal and calculates the time correction to create its internal GNSS timescale. The GNSS processor 103 has several PPS outputs coupled with its internal GNSS timescale. One PPS output 109 is outputted from the processor 103 and may be used as a time reference for external devices. Another PPS is the internal PPS 110 connected to first input 111 of the TIMU 104. The second input 112 of TIMU 104 is connected to the external PPS 113, generated by an external time reference device 108.

The external time reference device 108 incudes a physical oscillator 114 and an electronic signal converter 115. The physical oscillator 114 has a high-stability oscillating process. Examples of processes of that kind are a cesium fountain or a hydrogen maser. Signals of the oscillator 114 are converted to the stable frequency signal 107 and the external PPS signal 113 by the electronic signal converter 115. Both these signals 107 and 113 are created from one common oscillating process that takes place in 114. Therefore, the signals 107 and 113 are synchronous.

The TIMU 104 transmits its data (usually a few bytes representing the time interval) to the GNSS processor 103 via a bidirectional in-circuit interface 116. GNSS processor 103 sends to the TIMU 104 some control and service information (e.g., configuration settings, whether the TIMU should do a coarse time interval determination or a fine one, etc.). Internally, the TIMU 104 includes an analog part 117 and a digital part 118. The analog part 117 is intended to measure time interval between two adjacent pulses received at inputs 111 and 112. The digital part 118 includes a microprocessor to process measured time intervals and to produce data for the GNSS processor 103. In one embodiment of the TIMU 104 the data processing is the simple measured data averaging and scaling to the standard time measuring units (milli, micro or picoseconds). In another embodiment of the TIMU 104 the data processing is the measured data filtration as a part of a delay locked loop. In this case, the firmware of the digital part 118 implements the loop filter 119. In one embodiment of this firmware the loop filter 119 is a Proportional-Integrating-Differentiating (PID) filter.

Figure 2:
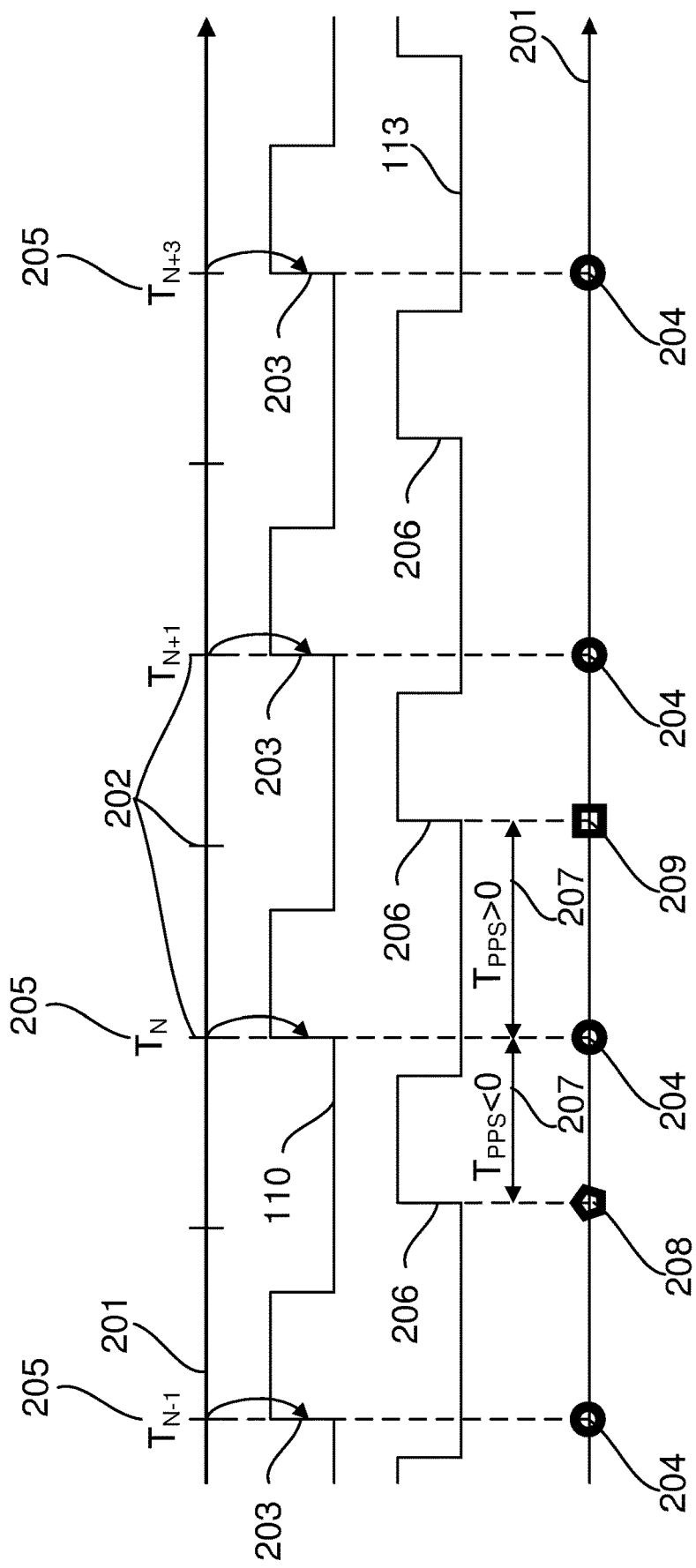
FIG. 2 shows GNSS measurements synchronization with the external timescale.

FIG. 2 illustrates the synchronization process of the GNSS timing receiver 101 with the external time reference device 108 from the point of view of GNSS measurements. Each GNSS timing receiver 101 implements its own replica of GNSS timescale 201. This timescale materialized by some periodic events 202 occurs inside the GNSS processor 103 clocked by the external frequency 107 or by the internal frequency 121. These events 202 are used to produce the internal PPS 110. In one embodiment of the GNSS receiver 101 the rising edges 203 of internal PPS 110 are synchronized with the periodic events 202. In one embodiment the rising edges 203 indicate default time instants on the timescale 201 when default GNSS measurements 204 are taken. Each default time instant for GNSS measurement has its own time tag 205 connected to GNSS timescale 201.

In one embodiment rising edges 206 of the external PPS 113 indicate required time instants when GNSS measurements should be taken. TIMU 104 continuously measures the duration of the time interval between consequent rising edges 203 and 206. If the rising edge 206 is detected before the rising edge 203 the time interval $T_{PPS}$ 207 is considered as negative, $T_{PPS}<0$. If the rising edge 203 is detected before the rising edge 206, the time interval $T_{PPS}$ 207 is considered as positive, $T_{PPS}>0$.

When the negative time interval 207 is measured, the required GNSS measurement 208 has to occur before the default GNSS measurement 204. When the positive time interval 207 is measured, the required GNSS measurement 209 have to occur after the default GNSS measurement 204. If the time position of the default GNSS measurement 204 has the time tag $T_N$, this time tag is preserved for new measurement position (for the time position of "earlier" measurement 208 or "later" measurement 209). So, when the measurement synchronization with external timescale is complete, the new measurement taken into the required time instant, but tagged by a time tag of the default time instant.

There are two embodiments of measured time intervals 207 processing by the firmware of TIMU 104. In one embodiment of the TIMU 104 the data processing is simple measured data averaging and scaling to standard time measuring units (milli-, micro- or picoseconds). In this case the averaged and scaled time interval value 207 is transmitted to GNSS processor 103. If this value is negative the firmware of the GNSS processor 103 interpolate the default GNSS measurement 204 to the past position of required GNSS measurement 208. If this value is positive, the firmware of the GNSS processor 103 extrapolates the default GNSS measurement 204 to the future position of the required GNSS measurement 209. No actual GNSS measurements positions are changed. The interpolated measurement 208 or extrapolated measurement 209 is used as output measurement of the GNSS receiver 101. Output measurement has the same time tag as actual measurement 204.

In another embodiment the TIMU 104 works as a difference unit for the negative feedback delay locked loop. In this case the firmware of the TIMU 104 implements loop filter 119. The aim of this locked loop is to set the measured time interval 207 to zero. The TIMU 104 transmits the output value of the loop filter 119 after each new time interval measurement. This value is used by firmware of the GNSS processor 103 to shift the time instant of the actual GNSS measurement 204 toward the required time instant of GNSS measurement (208 or 209). When the time instant of the actual GNSS measurement is shifted according the control value received from the TIMU 104, the edge 203 of the internal PPS 110 and the time tag 205 will be shifted also. After the completion of the transition process, the time instant of the actual GNSS measurement 205 will coincide with required time instant for GNSS measurement. The error of this coincidence is determined by the design of the loop filter 119. If the loop filter 119 is designed properly, this error is negligible for the GNSS processor 103 clocked by the highly stable external frequency 107 or very small if the processor 103 is clocked by internal frequency 121.

Figure 3:
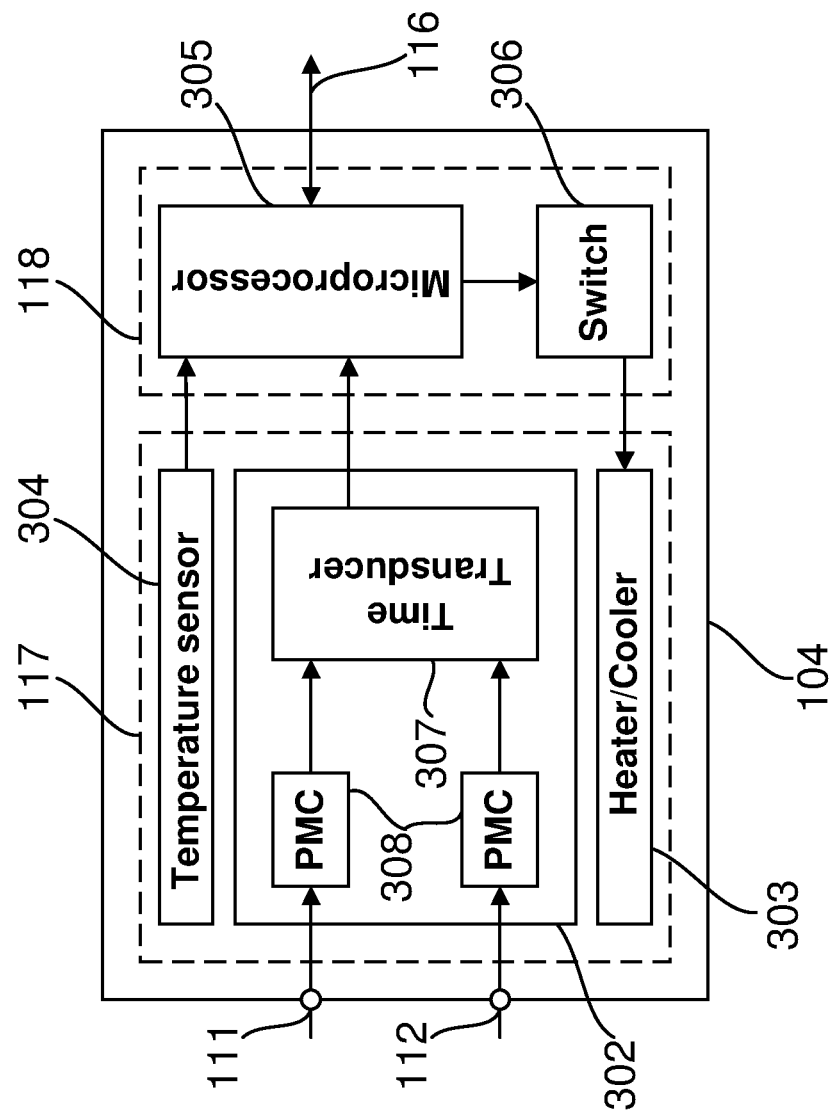
FIG. 3 shows an internal structure of the time interval measurement unit (TIMU).

FIG. 3 demonstrates the Time Interval Measurement Unit structure. TIMU 104 consists of the analog part 117 and the digital part 118. The analog part 117 includes a thermostabilized area 302 with analog circuits to measure time intervals, a heater/cooler 303 and a temperature sensor 304. The digital part 118 includes a microprocessor 305 and a power switch 306 to control the electric current electric current flowing through the heater/cooler 303. Time interval measuring circuit, placed inside the thermostabilized area 302, includes a time interval transducer 307 and pulse matching circuits (PMC) 308.

The TIMU 104 has two PPS inputs. The first PPS input 111 is intended to connect internal PPS 110. The second PPS input 112 is intended to connect the external PPS 113. Pulse signals received from inputs 111 and 112 are passed through two identical PMCs 308. The purpose of these PMCs is to match input impedances of TIMU 104 signal inputs 111, 112, to match signal levels at inputs 111 and 112 and required signal levels at inputs of time transducer 307, etc. The time transducer 307 measures the time interval 207 between two consequent edges at the first input 111 and at the second input 112. The measured time interval value 207 is prepared by the microprocessor 305.

The microprocessor 305 controls the time transducer 307, sets the operation mode for the time transducer 307, reads time interval measurements, etc. Data readied from the time transducer 307 is processed in the microprocessor 305. Processed data is transmitted to GNSS processor 103 via the bidirectional interface 116.

Also, the microprocessor 305 controls the temperature stabilization of the thermostabilized area 302. To do this the microprocessor 305 reads the temperature of area 302 from the temperature sensor 304. The microprocessor 305 compares the read temperature with the target temperature of area 302. If these temperatures are different, the microprocessor 305 starts to control the switch 306 to set the value and the direction of the electric current flowing through the heater/cooler 303. The amplitude and the direction of the electric current are selected to eliminate the difference between measured and target temperatures.

The heater/cooler 303 has two embodiments. In one embodiment 303 is a Peltier element. In this embodiment, the heater/cooler 303 can heat the area 302 with the one direction of the electric current flowing through it. Also, the heater/cooler 303 can cool the area 302 with the opposite direction of the electric current flowing through it. In this embodiment of the heater/cooler 303 the switch 306 has to switch the current direction to achieve the target temperature of 302.

In another embodiment, the heater/cooler 303 is a simple heater (without a cooling function). In this embodiment 303 can only heat the area 302. The cooling of the area 302 is achieved by natural heat convection when 303 is switched off. In this embodiment of 303 the switch 306 has to turn on and off the current to achieve the target temperature of 302. The direction of the current does not matter.

Figure 4:
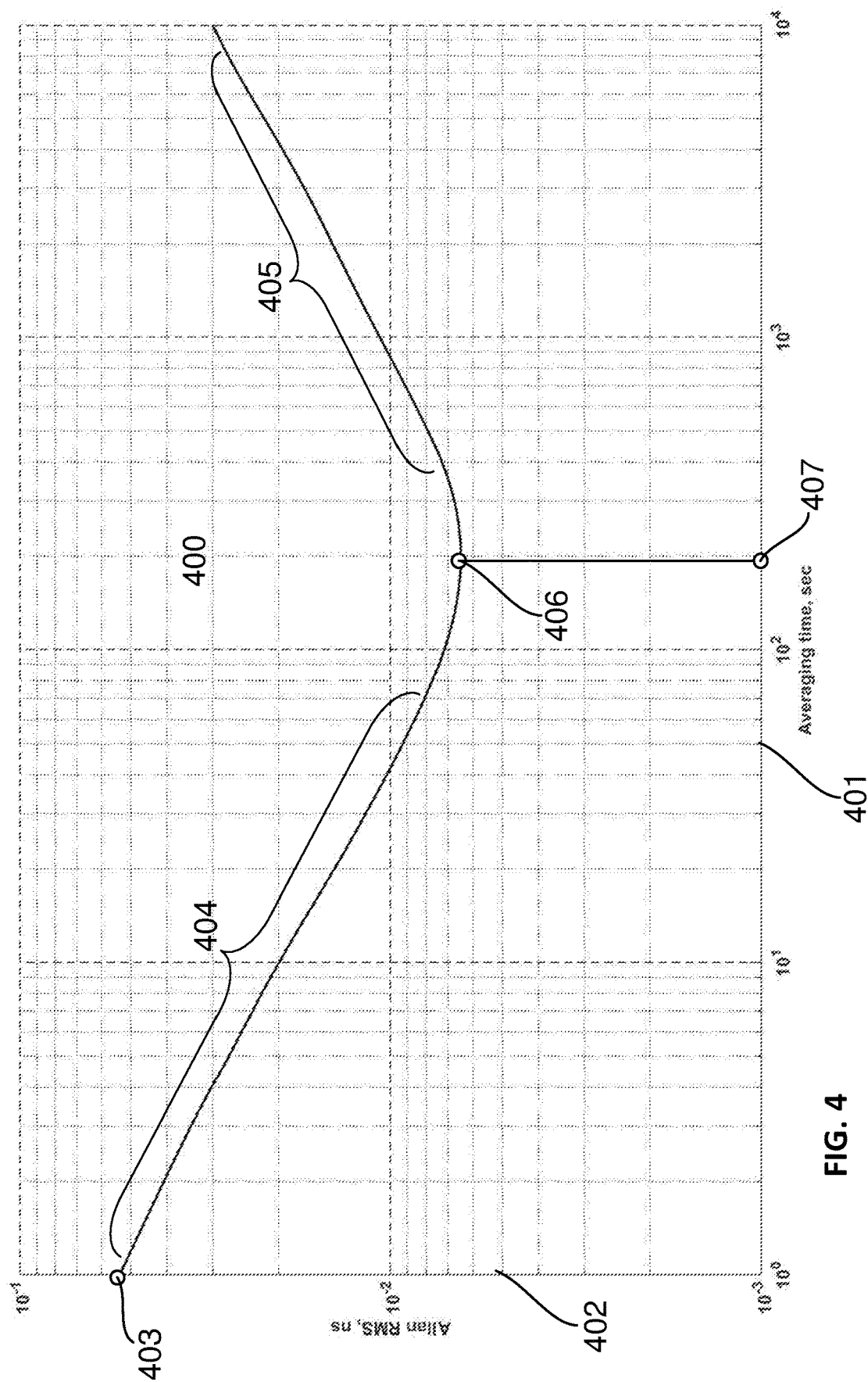
FIG. 4 shows Allan Variance for time interval measurements.

FIG. 4 illustrates a typical Allan variance for the time interval measurements. The Allan variance 400 is an industry-standard tool to analyze the structure of the measurement noise, clock or oscillator drifts, and to demonstrate the effect of the time interval measurements averaging by the sliding window. The single measurement of the time interval 207 does not have enough precision. The typical Root Mean Square (RMS) of the noise error of that single measurement is 50-100 ps. This noise error may be reduced if several consequent original measurements are averaged. In this case the mean value is used as the output value. When a new original measurement became available, it is added to the set of data for averaging, and the oldest previous measurement is removed from this set of data. So, the set of data for averaging is continuously updated, but the length of this set of data remains constant and finite. This approach to finite-length averaging is known as sliding-window averaging. The length of the data set is called the length of the sliding window. If the period of data sampling is constant, the product of this period and the length of the window give the duration of the sliding window or the averaging time. The averaging time is the horizontal axis 401 of the Allan variance. The vertical axis 402 is the square root of the Allan variance, called "Allan RMS".

If we have the PPS period of 1 sec, the averaging time of 1 sec means no averaging in fact. The output value is exactly equal to the original interval measurement value. The Allan RMS value 403 for this shortest averaging time is equal to original single-measurement noise RMS (55 ps for this particular case). When the averaging time is increased (or the length of the sliding window is increased), the measurement noise RMS of the averaged value decrease inversely proportionally to the square root of averaging time. This decrease manifests itself as a part 404 of the Allan RMS with a negative slope.

However, obviously, it is impossible to increase the averaging time infinitely. All real measurement data contain slow-varying random drifts. When the averaging time is small these drifts does not contribute to the Allan variance, because they look like constants. But when the increasing averaging time becomes comparable to a characteristic time of these slow random drifts, they start to contribute to the Allan variance as additional random processes. After that moment, the RMS of the averaged value starts to increase along with the averaging time increase. This increase manifests itself as a part 405 of the Allan RMS with a positive slope.

There is the optimal point 406, where the averaging time is long enough to remove a significant part of the measurement noise but short enough in comparison with the characteristic time of slow random drifts. The averaging time 407 corresponding to this point 406 is the optimal averaging time. For this particular case 400 this point 406 may be found at the optimal averaging time 407 equal to 200 sec. The RMS of this averaged value is 6 picoseconds. The value of the averaging time 407 for this point 406 is constant and depends on drifts and noises parameters of the TIMU 104, the GNSS processor 103 and the external time reference device 108. The optimal averaging time 407 is chosen as the duration of the sliding window for the time interval measurements processing within the TIMU 104.

Another approach to time interval measurements averaging is the use of a digital low-pass filter instead of a sliding window. The frequency response of this low-pass filter is designed to match the power-spectral density of slow random drifts. In this case this matched low-pass filter effectively removes a significant part of an energy of a wideband random measurement noise. On the other hand, this filter passes through a significant part of the energy of a narrow-band low-frequency spectrum of slow random drifts.

As will be appreciated, all or some of the various components described above can be implemented as discrete components, as an integrated circuit, or as an ASIC or an FPGA. Using a board, such as a motherboard, for mounting the components of the GNSS is a common approach, although the invention is not limited to this embodiment.

Having thus described a preferred embodiment, it should be apparent to those skilled in the art that certain advantages of the described method and system have been achieved.

It should also be appreciated that various modifications, adaptations, and alternative embodiments thereof may be made within the scope and spirit of the present invention. The invention is further defined by the following claims.

Related documents, all incorporated herein by reference:
1. Zarchan, P. (ed), *Global Positioning System: Theory and Application*. Vol. 1, AIAA, Washington, D.C., 1996.
2. Klepczynski, W. J, *GPS for Precise Time and time Interval Measurement at Global Positioning System: Theory and Application*. Vol. 2, AIAA, Washington, D.C., 1996.
3. U.S. Pat. No. 5,736,960, entitled "Atomic Clock Augmented Global Positioning System Receivers and Global Positioning System Incorporating Same."
4. U.S. Pat. No. 7,064,619 B1, entitled "Method and Apparatus for Restarting a GPS-based Timing System Without a GPS Signal."
5. U.S. Pat. No. 7,558,157 B1, entitled "Sensor Synchronization Using Embedded Atomic Clocks."
6. U.S. Pat. No. 6,424,293 B2, entitled "Electronic Timing Systems."

What is claimed is:
1. A GNSS receiver with synchronization to an external timescale, comprising:
   a processor receiving GNSS signals from an antenna through RF frontend;
   a local oscillator generating an internal clocking frequency signal;
   a Time Interval Measurement Unit (TIMU) that receives the internal PPS and an external PPS, measures a time interval between the internal and external PPS s and provides the time interval to the processor;
   the processor calculating GNSS coordinates based on the GNSS signals at a time indicated by the internal PPS and wherein the time is corrected by the time interval; and the processor outputting the corrected GNSS coordinates and a corrected timestamp of the GNSS coordinates based on the indicated time.

2. The GNSS receiver of claim 1, further comprising a housing having a first connector for receiving the external PPS from the external time source, the connector also being connected to the TIMU to provide the external PPS to the TIMU.

3. The GNSS receiver of claim 2, wherein the processor and the TIMU are inside the housing.

4. The GNSS receiver of claim 1, wherein the processor and the RF tracts are mounted on a motherboard.

5. The GNSS receiver of claim 4, wherein the TIMU is mounted on the motherboard.

6. The GNSS receiver of claim 1, wherein an internal clocking frequency signal is used for the GNSS coordinates calculation when an external clocking frequency signal is not available.

7. The GNSS receiver of claim 1, wherein the TIMU interfaces to the processor through a bidirectional interface.

8. The GNSS receiver of claim 7, wherein the processor uses the bidirectional interface to provide commands to the TIMU.

9. The GNSS receiver of claim 7, wherein the TIMU uses the bidirectional interface to provide the measured time interval to the processor.

10. The GNSS receiver of claim 1, wherein the TIMU measures the time interval between one edge of the internal PPS that is detected on a first input of the TIMU and a second edge of the external PPS that is detected on the second TIMU input.

11. The GNSS receiver of claim 1, wherein the processor shifts edges of the internal PPS to indicate new time instants when the GNSS coordinates are determined.

12. The GNSS receiver of claim 1, wherein the processor changes the timestamps according to the time intervals from the TIMU.

13. The GNSS receiver of claim 1, wherein the processor interpolates or extrapolates the GNSS coordinates to new measurement times based on the time intervals without physical shifts of actual GNSS coordinates.

14. The GNSS receiver of claim 13, wherein the extrapolated GNSS coordinates are used as output measurements of the GNSS receiver.

15. The GNSS receiver of claim 1, wherein the TIMU includes
an analog part to measure the time interval between two pulses;
a heater/cooler to change a temperature of the analog part;
a switch to change a direction and a value of an electric current flowing through the heater/cooler;
a temperature sensor to measure the temperature of the analog part;
a digital part to control the analog part, to control the temperature of the analog part and to process raw measurements of the time intervals; and
a measurement algorithm implemented using hardware, software or firmware, to reduce wide band measurement noise.

16. The GNSS receiver of claim 15, wherein the heater/cooler includes a Peltier module.

17. The GNSS receiver of claim 15, wherein the heater/cooler is a heating-only module.

18. The GNSS receiver of claim 15, wherein the measurement algorithm uses a sliding window data averaging algorithm with a sliding window length selected at a local minimum of Allan Variance.

19. The GNSS receiver of claim 15, wherein the measurement algorithm uses a digital low-pass filter with a frequency response matched to a power spectral density of slow random drifts.

20. The GNSS receiver of claim 15, wherein the measurement algorithm uses a loop filter to control time instants of actual GNSS coordinates.

21. The GNSS receiver of claim 20, wherein the loop filter is a Proportional-Integrating-Differentiating filter.

* * * * *